Patented Feb. 16, 1932

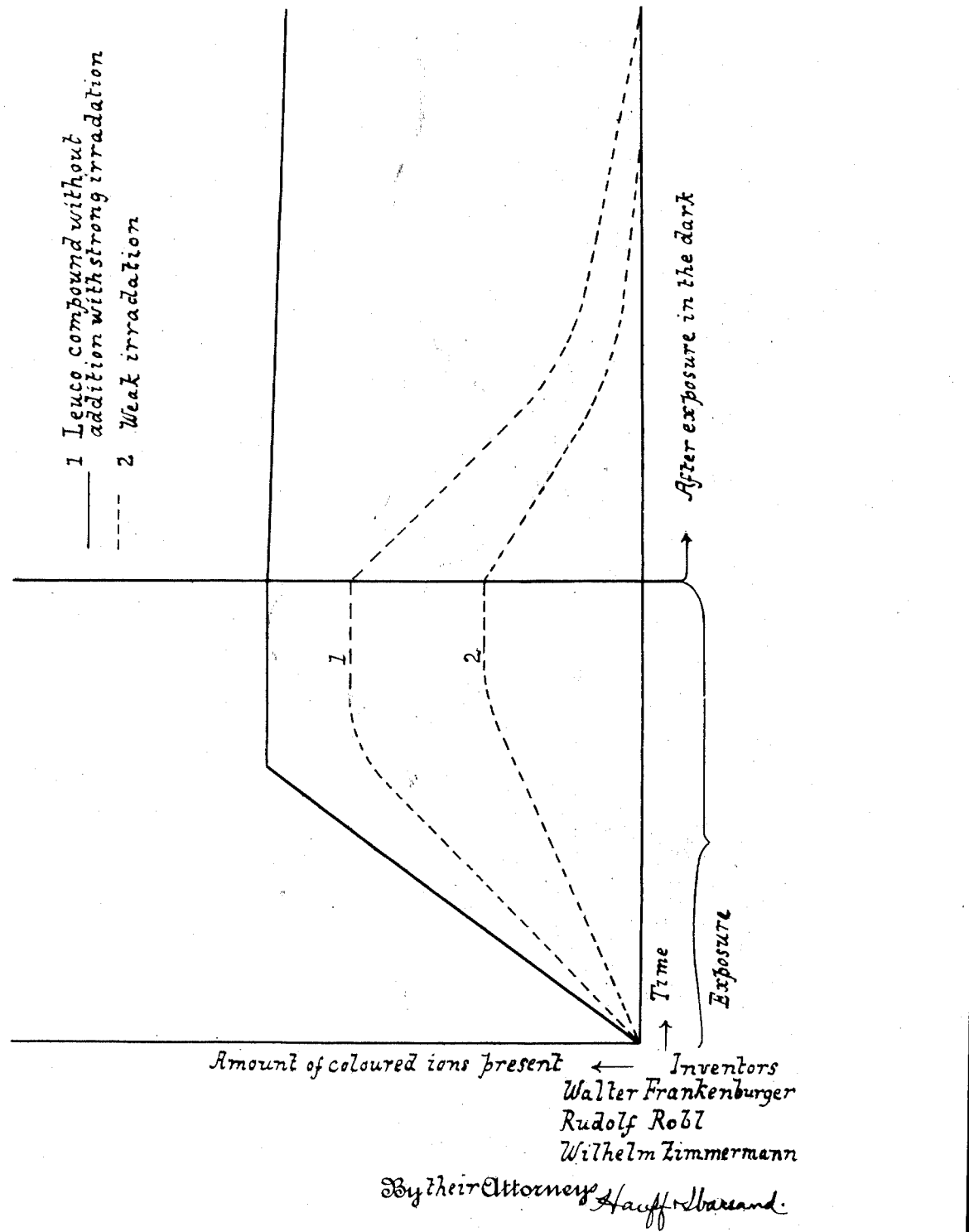

1,845,835

UNITED STATES PATENT OFFICE

WALTER FRANKENBURGER, OF LUDWIGSHAFEN-ON-THE-RHINE, RUDOLF ROBL, OF MANNHEIM, AND WILHELM ZIMMERMANN, OF FRIEDRICHSFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MEASURING THE INTENSITY OF ULTRAVIOLET RAYS

Application filed June 5, 1928, Serial No. 283,130, and in Germany June 9, 1927.

Continuous checking of the radiation intensity of the usual sources of light in the physiologically active region of ultra-violet radiation between $250\mu\mu$ and $380\mu\mu$, is a matter of considerable importance, especially in the case of mercury vapor quartz lamps, in view of the inconstancy. It is also frequently desirable to determine the proportion of ultra-violet rays in the daylight in various localities, and the extent to which this proportion suffers diminution on passing through windows and the like.

It is already known that certain so-called phototropic substances undergo characteristic changes of color when irradiated with visible or ultra-violet light, reversion occurring more or less rapidly when the irradiation is interrupted. This property of such substances is not in itself sufficient to enable rapid and simple measurements to be made of the intensity of radiation, since the phototropic substances always tend to assume the maximum depth of shade irrespective of the intensity of the ultra-violet radiation coming into action.

We have now found that the intensity of radiation may be measured in a simple manner in the region of the ultra-violet rays, by making use of the color change of phototropic coloring matters which have a range of sensitiveness practically identical with the spectral area under examination, suitably determined amounts of substances being added which counteract the photochemical color change, and thus enable reproducible degrees of coloration to be obtained. These colorations attain, after a short period of irradiation, a final value corresponding to the intensity of radiation in action, which value can be numerically expressed in terms of color, preferably with the aid of color scales which are fast to light.

On the basis of precise spectrographic determinations, it has been found that the solutions of phototropic basic coloring matters, such as the leucocyanides, carbinols or sulfurous compounds of coloring matters of the triphenylmethane series, come primarily under consideration as phototropic substances for ultra-violet light. These solutions remain colorless in the visible and in the short-wave ultra-violet region of the spectrums but acquire intensive coloration on irradiation with ultra-violet rays in the region between $210\mu\mu$ an $350\mu\mu$. This photochemical change is due to ionization of the phototropic coloring matter giving rise to strongly colored ions. After exposure to the ultra-violet rays the colored ions disappear slowly, the leuco-cyanides, carbinols or sulfurous compounds of the coloring matters being re-formed. By the addition of substances furnishing an equal ion to those present in the colored solution, such as for example potassium cyanide, caustic potash solution or sulfurous acid the re-formation of the colorless compounds from the strongly colored ions is largely accelerated. Since the re-formation takes place also during irradiation, an equilibrium between the ionization and the re-formation is established. The greater the intensity of the active rays the higher is the speed of the ionization while the speed of the re-formation remains unaltered and accordingly the coloration obtained corresponds to the amount of active irradiation. In the accompanying drawing the full line indicates the amount of colored ions present in a certain solution in the absence of additional substances. The dotted lines indicate the amount of colored ions present in the presence of the additional substances used according to the present invention, curve 1 indicating the amount in the case of strong irradiation and curve 2 that in the case of weak irradiation.

The numerical determination of the degree of coloration attained, and thereby of the radiation intensity under examination is preferably effected colorimetrically, by comparing the color of the irradiated specimen after equilibrium has been reached with a correspondingly graded color scale. The best method of effecting the comparison is by preparing solutions of the coloring matter formed by irradiation in a non-phototropic form, and using this for the comparison. Thus, for instance, when employing the leucocyanide of a basic coloring matter for measuring the radiation intensity, from which on irradiation with ultra-violet rays the coloring matter itself is reproduced, the color scale is made from gradually diluted solutions of the coloring matter itself. The scale may be graduated, by means of a series of preliminary comparative tests only once performed, in customary units of measurement, for example units of energy of the radiation per square centimetre, or sometimes in units which correspond to the physiological action of the radiation, such as the production of erythema on the skin. By means of the said solutions and addition it is easy to measure the radiation intensity of the medicinally important ultra-violet region of artificial sources of light, such as mercury vapor quartz lamps, as well as the content of ultra-violet rays in the sun rays at different altitudes of the atmosphere.

The above described process of measuring the intensity of radiation of sources of ultra-violet rays allows of a simple and precise manner of determining the amount of irradiation with ultra-violet rays to be applied.

The following examples will further illustrate the nature of the said invention which however is not limited thereto. The parts are by weight.

*Example 1*

4 parts of a cold-saturated solution of potassium cyanide in ethyl alcohol are added to 100 parts of a cold-saturated solution of crystal violet leucocyanide in ethyl alcohol. The colorless solution is placed in a quartz tube and is exposed, at varying distances, for at least 1 minute, to the light of a mercury-vapor quartz lamp. According to the distance from the lamp, a varying depth of coloration is produced, the degree of which can be ascertained by means of a color scale. This latter may be prepared in the following manner, namely by dissolving 0.02 gram of crystal violet in 100 cc. of absolute alcohol, and diluting 10 cc. of this solution with 10.6 cc. of absolute alcohol, the mixture being well shaken. Of this solution in turn, 10 cc. are diluted with 10.6 cc. of absolute alcohol and so on until 10 dilutions are prepared, forming the 10 degrees of the color scale.

Proceeding on these lines, a source of light of the mercury-vapor quartz lamp type gives the following values:—

|  | Distance from lamp | Degrees on the scale |
|---|---|---|
| (1) | 20 cm. | 7–8° |
| (2) | 40 cm. | 7° |
| (3) | 60 cm. | 6° |
| (4) | 100 cm. | 5° |

*Example 2*

6 parts of a cold-saturated solution of potassium cyanide in ethyl alcohol are added to 100 parts of a cold-saturated solution of fuchsine leucocyanide in ethyl alcohol. The solution, which is slightly red at first, becomes colorless on gently warming. If the colorless solution be exposed to sunlight, in a quartz tube, a red coloration is produced in from 1 to 2 minutes, the depth of which does not increase on prolonging the exposure compared with a standard solution of fuchsine. The coloration obtained in diffuse daylight is considerably weaker, and no coloration at all is produced by the light of an incandescent electric lamp. On being placed in the dark, the colored solution decolorizes in about 20 minutes. In this manner, it is possible to measure the proportion of ultra-violet radiation in any source of light. A solution suitable for measuring the intensity of sources of ultra-violet light can also be prepared by adding an accurately calculated quantity of caustic potash solution to a solution of the carbinol base of fuchsine or of any other triphenylmethane dyestuff.

*Example 3*

Sulfur dioxid is passed into an aqueous solution of 1 gram of malachite green in 200 cc. of water, until complete decoloration occurs. The colorless solution is heated on the boiling waterbath, to eliminate the surplus sulfur dioxid. As soon as the color turns dark green, the solution is cooled, thereby again completely losing its color. A solution prepared in this manner contains exactly the excess of sulforous acid needed for establishing a state of equilibrium during irradiation.

What we claim is:—

1. A process of measuring the intensity of radiation of sources of ultra-violet rays which comprises exposing to irradiation a solution of a compound selected from the group consisting of leucocyanides, carbinols and sulfurous compounds of a basic coloring matter, to which such small amounts of an agent furnishing an ion equal to that formed by ionization of the phototrophic coloring matter as do not entirely prevent the change of color have been added, and determining the degree of color change by comparison with a scale of standard solutions of a coloring matter.

2. A process of measuring the intensity of radiation of sources of ultra-violet rays which comprises exposing to irradiation a solution of a compound selected from the group consisting of leucocyanides, carbinols and sulfurous compounds of a coloring matter of the triphenylmethane series, to which such small amounts of an agent furnishing an ion equal to that formed by ionization of the phototrophic coloring matter as do not entirely prevent the change of color have been added, and determining the degree of color change by comparison with a scale of standard solutions of the coloring matter formed by irradiation.

3. A solution for measuring the intensity of radiation of sources of ultra-violet rays comprising a phototrophic coloring matter selected from the group consisting of leucocyanides, carbinols and sulfurous compounds of a basic coloring matter, and an agent capable of furnishing an ion equal to that formed by ionization of the phototropic coloring matter in an amount insufficient to entirely prevent the change of color of said phototropic coloring matter on exposure to ultra-violet rays.

4. A solution for measuring the intensity of radiation of sources of ultra-violet rays comprising a phototropic coloring matter selected from the group consisting of leucocyanides, carbinols and sulfurous compounds of coloring matters of the triphenylmethane series, and an agent capable of furnishing an ion equal to that formed by ionization of the phototropic coloring matter in an amount insufficient to entirely prevent the change of color of said phototropic coloring matter on exposure to ultra-violet rays.

In testimony whereof we have hereunto set our hands.

WALTER FRANKENBURGER.
RUDOLF ROBL.
WILHELM ZIMMERMANN.